US011550751B2

(12) United States Patent
Orr et al.

(10) Patent No.: US 11,550,751 B2
(45) Date of Patent: Jan. 10, 2023

(54) SEQUENCE EXPANDER FOR DATA ENTRY/INFORMATION RETRIEVAL

(71) Applicant: Microsoft Technology Licensing, LLC, Redmond, WA (US)

(72) Inventors: Douglas Alexander Harper Orr, Brentwood (GB); Matthew James Willson, London (GB); Marco Fiscato, London (GB); Juha Iso-Sipilä, London (GB); Joseph Osborne, London (GB); James Peter John Withers, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 740 days.

(21) Appl. No.: 15/356,245

(22) Filed: Nov. 18, 2016

(65) Prior Publication Data

US 2018/0143760 A1    May 24, 2018

(51) Int. Cl.
  *G06F 16/00*    (2019.01)
  *G06N 3/04*    (2006.01)
  *G06N 3/08*    (2006.01)

(52) U.S. Cl.
  CPC ........... *G06F 16/00* (2019.01); *G06N 3/0454* (2013.01); *G06N 3/088* (2013.01)

(58) Field of Classification Search
  CPC .. G06F 3/04886; G06F 3/0233; G06F 3/0236; G06F 3/0237; G06F 16/24; G06F 16/243; G06F 16/00; G06N 3/0454; G06N 3/088
  See application file for complete search history.

(56) References Cited

U.S. PATENT DOCUMENTS

| 7,149,550 | B2 | 12/2006 | Kraft et al. | |
| 7,167,731 | B2 * | 1/2007 | Nelson | H04M 1/72547 340/7.56 |
| 7,171,351 | B2 | 1/2007 | Zhou | |
| 7,640,256 | B2 * | 12/2009 | Inglis | G16B 50/00 |
| 7,702,508 | B2 * | 4/2010 | Bennett | G06F 40/42 704/257 |

(Continued)

FOREIGN PATENT DOCUMENTS

| WO | 1997038376 A2 | 10/1997 |
| WO | 2014098798 A1 | 6/2014 |

OTHER PUBLICATIONS

Ghosh, et al., "Contextual LSTM (CLSTM) models for Large scale NLP tasks", In Journal of Computing Research Repository, Feb. 2016, 10 pages.

(Continued)

*Primary Examiner* — Miranda Le
(74) *Attorney, Agent, or Firm* — Schwegman Lundberg & Woessner, P.A.

(57) ABSTRACT

An electronic device is described which has a user interface which receives an input comprising a sequence of target indicators of data items. The data entry system has a search component which searches for candidate expanded sequences of indicators comprising the target indicators. The search component searches amongst indicators generated by a trained conditional language model, the conditional language model having been trained using pairs, each individual pair comprising a sequence of indicators and a corresponding expanded sequence of indicators.

20 Claims, 9 Drawing Sheets

(56) References Cited

U.S. PATENT DOCUMENTS

| | | | |
|---|---|---|---|
| 8,347,222 B2 | 1/2013 | Raguseo | |
| 8,386,232 B2* | 2/2013 | Peng | G06F 40/289 704/3 |
| 8,407,208 B2* | 3/2013 | Ben Shahar | G06F 16/319 707/715 |
| 8,521,515 B1 | 8/2013 | Harik et al. | |
| 8,521,731 B2* | 8/2013 | Broder | G06F 16/3338 707/728 |
| 8,682,649 B2* | 3/2014 | Bellegarda | G10L 13/10 704/10 |
| 8,712,780 B2 | 4/2014 | Narayanan | |
| 8,738,365 B2* | 5/2014 | Ferrucci | G06F 16/3329 704/9 |
| 8,775,526 B2* | 7/2014 | Lorch | H04M 1/7253 455/556.1 |
| 8,849,931 B2* | 9/2014 | Linner | G06F 17/2765 707/755 |
| 8,893,023 B2* | 11/2014 | Perry | G06F 17/24 715/752 |
| 8,954,422 B2* | 2/2015 | Hasan | G06Q 30/02 707/723 |
| 9,031,330 B2* | 5/2015 | Evanitsky | G06K 9/6807 382/218 |
| 9,189,157 B2* | 11/2015 | Pasquero | G06F 3/04886 |
| 9,372,608 B2* | 6/2016 | Leydon | H04W 4/18 |
| 9,384,185 B2* | 7/2016 | Medlock | G06F 40/274 |
| 9,600,764 B1* | 3/2017 | Rastrow | G06N 3/049 |
| 9,665,567 B2* | 5/2017 | Liu | G06F 40/35 |
| 9,690,767 B2* | 6/2017 | Leydon | G06F 3/0238 |
| 9,742,912 B2* | 8/2017 | Srivastava | G06F 17/21 |
| 9,767,789 B2* | 9/2017 | Radebaugh | G10L 13/08 |
| 9,799,327 B1* | 10/2017 | Chan | G06F 40/12 |
| 2006/0265648 A1* | 11/2006 | Rainisto | G06F 3/04886 715/259 |
| 2007/0266090 A1* | 11/2007 | Len | G06F 40/103 709/204 |
| 2008/0167861 A1* | 7/2008 | Inoue | A61B 5/16 704/206 |
| 2009/0106695 A1* | 4/2009 | Perry | G06F 17/24 715/816 |
| 2010/0017382 A1* | 1/2010 | Katragadda | G06F 16/90332 706/12 |
| 2010/0088616 A1* | 4/2010 | Park | H04L 51/04 715/762 |
| 2010/0317381 A1* | 12/2010 | van Meurs | H04L 12/1859 455/466 |
| 2010/0318348 A1* | 12/2010 | Chelba | G06F 40/211 704/9 |
| 2012/0265826 A1* | 10/2012 | Morinaga | G06F 40/131 709/206 |
| 2013/0030793 A1 | 1/2013 | Cai et al. | |
| 2013/0159220 A1* | 6/2013 | Winn | G06Q 10/10 706/12 |
| 2013/0191738 A1 | 7/2013 | Bank et al. | |
| 2013/0231922 A1 | 9/2013 | Park et al. | |
| 2013/0262994 A1* | 10/2013 | McMaster | G06F 17/2264 715/261 |
| 2014/0012568 A1 | 1/2014 | Caskey et al. | |
| 2014/0088954 A1* | 3/2014 | Shirzadi | G06F 40/166 704/9 |
| 2014/0163957 A1* | 6/2014 | Tesch | H04L 51/063 704/9 |
| 2014/0325000 A1* | 10/2014 | Lorch | H04M 1/7253 709/206 |
| 2015/0178265 A1* | 6/2015 | Anderson | G06F 16/951 704/9 |
| 2015/0286371 A1* | 10/2015 | Degani | G06F 3/04817 705/14.64 |
| 2016/0180215 A1* | 6/2016 | Vinyals | G06F 17/2705 706/20 |
| 2016/0219006 A1* | 7/2016 | Yuen | H04L 51/04 |
| 2016/0224524 A1 | 8/2016 | Kay et al. | |
| 2016/0259502 A1* | 9/2016 | Parrott | G06F 3/0482 |
| 2016/0283581 A1* | 9/2016 | Berajawala | G06F 16/3329 |
| 2016/0299685 A1* | 10/2016 | Zhai | G06F 3/04886 |
| 2016/0357855 A1* | 12/2016 | Fan | G06F 16/3344 |
| 2016/0359771 A1* | 12/2016 | Sridhar | H04L 51/02 |
| 2017/0039174 A1* | 2/2017 | Strope | G06F 40/253 |
| 2017/0052946 A1* | 2/2017 | Gu | G06F 17/279 |
| 2017/0061958 A1* | 3/2017 | Ding | G10L 15/1822 |
| 2017/0083491 A1* | 3/2017 | Kumhyr | G06F 17/24 |
| 2017/0083506 A1* | 3/2017 | Liu | G06F 17/279 |
| 2017/0083586 A1* | 3/2017 | Huang | G06F 17/2785 |
| 2017/0140214 A1* | 5/2017 | Matas | G06K 9/00335 |
| 2017/0185580 A1* | 6/2017 | Zhang | G06F 3/04842 |
| 2017/0185581 A1* | 6/2017 | Bojja | G06F 40/242 |
| 2017/0270100 A1* | 9/2017 | Audhkhasi | G06F 40/30 |
| 2017/0270919 A1* | 9/2017 | Parthasarathi | G10L 15/02 |
| 2017/0323636 A1* | 11/2017 | Xiao | G06F 40/289 |
| 2018/0180276 A1* | 6/2018 | Zeng | A47F 11/10 |

OTHER PUBLICATIONS

Sutskever, et al., "Sequence to Sequence Learning with Neural Networks", In Journal of Advances in Neural Information Processing Systems, Dec. 8, 2014, pp. 1-9.

* cited by examiner

SEQUENCE EXPANDER FOR DATA ENTRY/INFORMATION RETRIEVAL

BACKGROUND

Data entry into electronic devices such as smart phones, smart watches and other wearable computing devices, tablet computers and others is time consuming, error prone and burdensome for end users. Sequences of indicators such as words, emoji, pictograms, letters, symbols and other indicators need to be specified one by one by means of user input of some type, such as key presses on a virtual or physical keyboard, gesture based input, spoken input or other modalities of user input.

In the case of text entry, it is time consuming to type a whole sentence, with a lot of predictable text between the key information-bearing words. Even with next-word prediction and correction, as in current mobile virtual keyboards, entering text word-by-word can be slow. This also applies to other types of sequences of indicators such as emoji, pictograms and others. In the case of emoji or pictograms there is often no emoji or pictogram available to express "predictable text" such as the word "the" which makes it hard for end users to enter that data by using only emoji or pictograms.

Use of lists of pre-canned standard replies for a user to scroll through and select from is very limited in that only the standard replies that are available in the list can be selected. If a user wants to make a different reply, or a reply that varies from one of the standard replies, he has to make more text input and also editing user input. Also, use of pre-canned standard replies relies heavily on context information being available in order to select appropriate pre-canned standard replies to present to a user. Technology which automatically generates replies to messages based only on the preceding message thread relies on the information in the preceding message thread. Typically candidate replies need to be manually edited by the end user.

Information retrieval is difficult for many end users since the relevance of retrieved results to input search queries is often poor. Query suggestion facilities are available in some information retrieval systems. Some query suggestion facilities search for words which are semantically similar to query terms or search for queries in query logs which are similar to the input query terms. Candidate query suggestions are then offered to end users. Query expansion is also available whereby queries input by a user are expanded to include more query terms. The expanded queries are used to retrieve results such that the results may have greater relevance to the end user. Some query expansion methods use query logs or search for terms which are semantically similar to the query terms.

The embodiments described below are not limited to implementations which solve any or all of the disadvantages of known sequence expanders.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An electronic device is described which has a user interface which receives an input comprising a sequence of target indicators of data items such as words, emoji or other data items. The data entry system has a search component which searches for candidate expanded sequences of indicators comprising the target indicators or translations of the target indicators. The search component searches amongst indicators generated by a trained conditional language model, the conditional language model having been trained using pairs, each individual pair comprising a sequence of indicators and a corresponding expanded sequence of indicators. The candidate expanded sequence of indicators may be used for data entry, for example, on a smart watch, or may be used for query expansion or query suggestion in the case of information retrieval.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Inputting text and other sequences such as sequences of emoji or pictograms, is often time consuming and cumbersome for end users. This is a particular problem for smart watches, smart phones and other small form factor electronic devices. In various examples described herein a sequence expander is used to compute candidate expanded sequences from one or more target indicators provided by a user. For example, the target indicators are words or pictograms or emoji. The expanded sequences may be offered to an end user for data entry into an electronic device such as a smart phone or other electronic device. In this way a user can input a whole sentence for example, by typing in a subset of words from the sentence or by typing in pictograms, emoji, or other symbols that represent part of the sentence but not the whole sentence. The sequence expander comprises neural network technology combined with a search component and this combination is found to give relevant, useful, candidate expanded sequences in an efficient manner. This is achieved without the need to use an n-gram language model which is computationally expensive. The technology may also be used for query expansion or query suggestion in the field of information retrieval.

Figure 1:
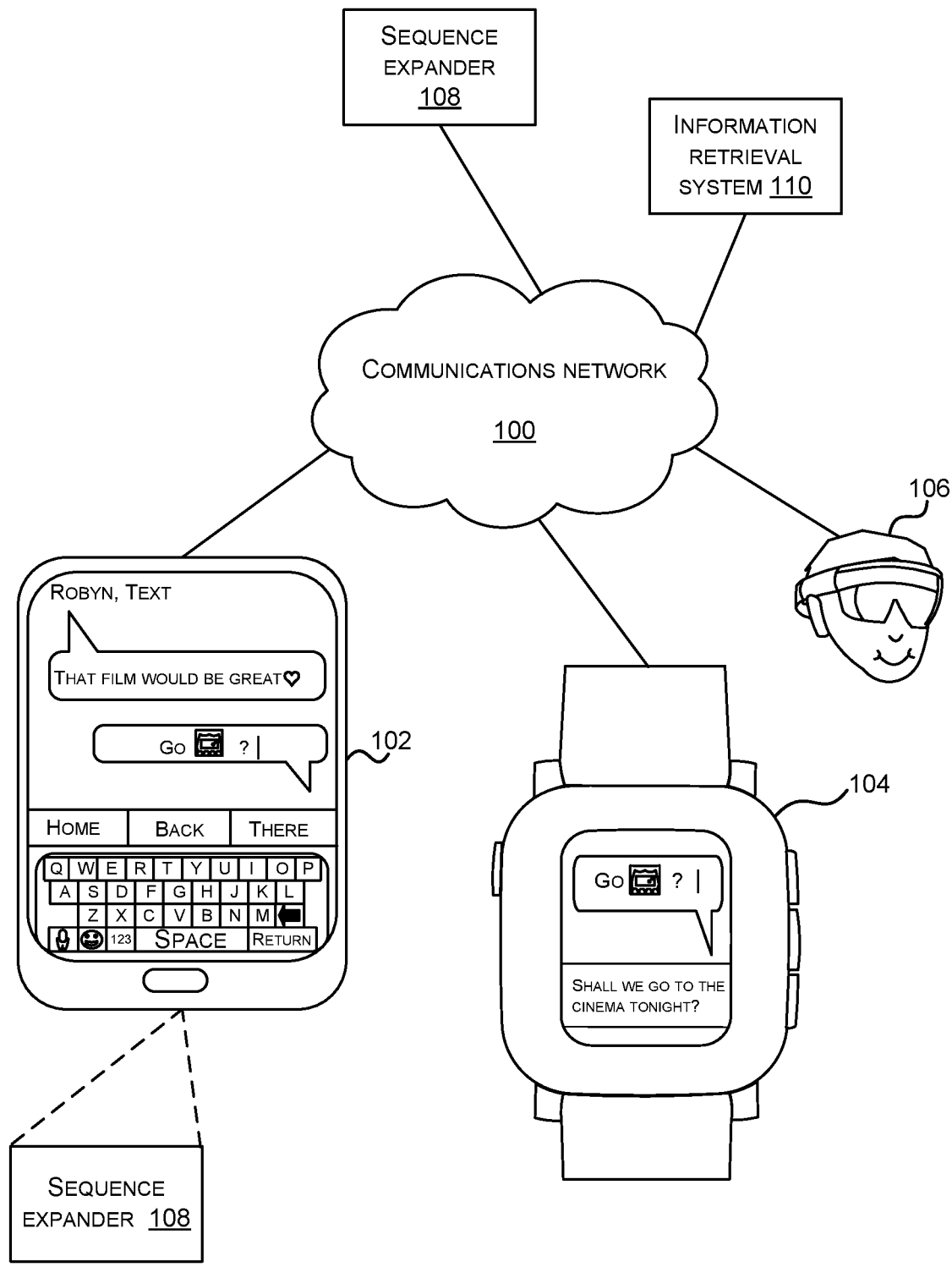
FIG. 1 is a schematic diagram of electronic devices which either have a sequence expander or which are able to access sequence expander services from another entity over a communications network.

FIG. 1 is a schematic diagram of electronic devices 102, 104, 106 which either have a sequence expander 108 or which are able to access sequence expander services from another entity over a communications network 100. The electronic devices illustrated include a smart phone 102, a smart watch 104 and an augmented-reality head worn computing device 106 and these are examples intended to illustrate use of the technology and not to limit the scope of application of the technology.

In the case of the smart phone 102, a user is able to type in text, emoji and pictograms and receive a candidate expanded sequence. The user is able to use the candidate expanded sequence to facilitate data entry to the smart phone 102 and/or for information retrieval. In the case of information retrieval and where the sequence expander is at the smart phone, the smart phone 102 sends the expanded sequence to an information retrieval system 110 over the communications network 100. The information retrieval system 110 receives the expanded sequence and treats the expanded sequence as a query so that it retrieves a ranked list of results using well known information retrieval technology. The ranked list of results is returned to the smart phone 102.

In the case of the smart watch 104, a user is able to use speech input and/or to type in text, emoji and pictograms. This input is sent to a sequence expander 108 over the communications network 100 which returns one or more candidate expanded sequences. The candidate expanded sequence(s) are made available at the smart watch 104 for data entry by an end user. It is also possible for the user input to be sent to the information retrieval system 110 over the communications network 100. The information retrieval system 110 works with the sequence expander 108 located in the cloud remote of the smart watch 104 to compute an expanded sequence which is then used by the information retrieval system as a query.

In the case of the augmented-reality head worn computing device 106 the user is able to input text, emoji and pictograms using gesture input, eye movements, speech input or other input. The computing device 106 either has an integral sequence expander 108 or makes use of a sequence expander 108 which is remote of the computing device 106 via communications network 100. The sequence expander 108 computes one or more candidate expanded sequences which are used to facilitate data entry and/or for information retrieval using information retrieval system 110.

In the examples described above various different forms of user input are mentioned for the sake of example and the technology is not limited to a particular type of user input.

Figure 2:
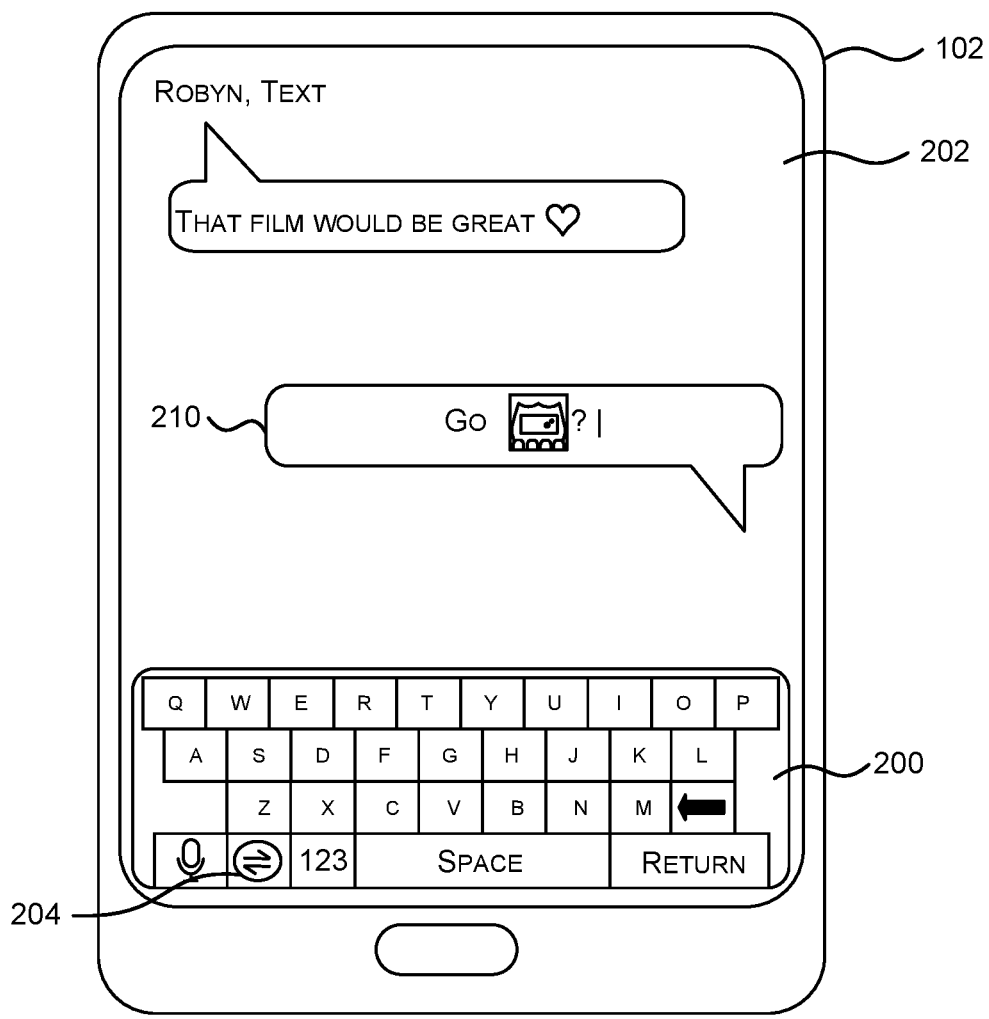
FIG. 2 is a schematic diagram of an electronic device with a virtual keyboard and a user interface for generating and sending messages using a sequence expander.

FIG. 2 shows the smart phone 102 of FIG. 1 in the case that the smart phone has a messaging application executing on the smart phone 102. A user has received a message saying "That film would be great" and with an emoji at the end of the message. A display screen 202 of the smart phone 102 displays the received message and also has an indicator entry field 210 into which a user of the smart phone 102 is in the process of entering indicators. In the example illustrated the user has entered the word "Go", an emoji which depicts a cinema, and a question mark. The term indicator is used herein to refer to a code (such as a Unicode code point), number or other reference to a data item, where the data item is a word, symbol, emoji, pictogram, or other data item. The indicators which the user has entered are referred to as target indicators herein, in order to distinguish these from indicators which are different from the ones the user has entered and which are generated by the sequence expander.

In the example of FIG. 2 the smart phone 202 has a virtual keyboard 200 which may be used to type in the target indicators to indicator field 210. However, it is also possible to use speech input or other forms of input to enter the target indicators.

Figure 3:
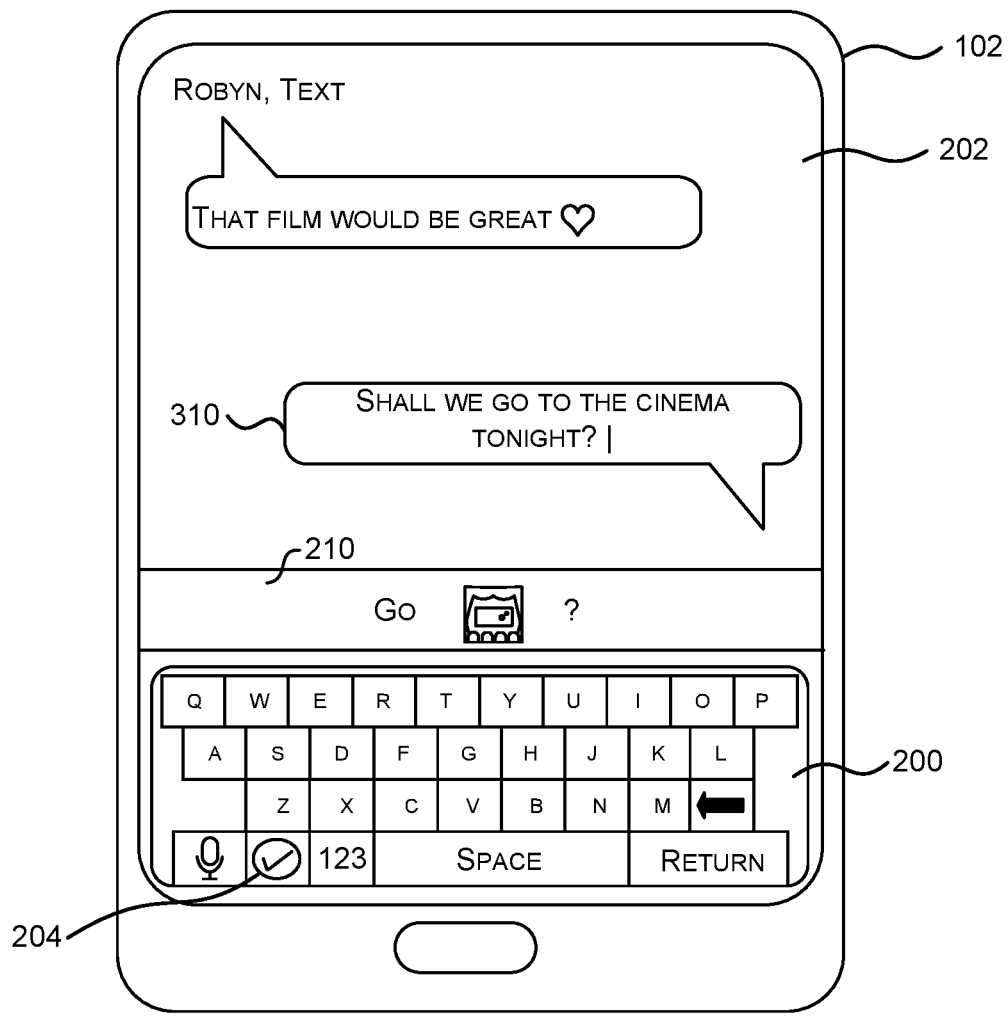
FIG. 3 is a schematic diagram of the electronic device of FIG. 2 showing an expanded sequence generated by a sequence expander.

In the example of FIG. 2 the virtual keyboard 200 comprises a toggle key 204 which when pressed causes the indicator field 210 to be replaced by an expanded sequence field 310 as illustrated in FIG. 3. FIG. 3 shows smart phone 102 of FIG. 1 and FIG. 2 after a user has selected toggle key 204. The sequence expander 108 takes the target indicators from the indicator field 210 and computes at least one candidate expanded sequence of indicators. The candidate expanded sequence of indicators is presented in an expanded sequence field 310 which may replace the indicator field 210. In the example of FIG. 3 the indicator field is moved to a location just above the virtual keyboard so that it is still visible to the user. However, it is not essential to include the indicator field 210 since the user is able to return to the situation of FIG. 2 by selecting toggle key 204. The user is able to edit the indicator field 210 and/or the expanded sequence field 310 in the situation of FIG. 3. In the case that the user edits the target indicators in indicator field 210, the candidate expanded sequence of indicators is recomputed using the sequence expander 108. The updated candidate expanded sequence is then made available in the expanded sequence field 310. In this way a user is able to repeatedly toggle between the situations of FIGS. 2 and 3 and made edits to the indicator field 210 in order to obtain an expanded sequence that the user is happy with. Using a toggling mechanism in this manner is found to be intuitive and easy to use.

In the example of FIG. 3 the sequence expander has translated the emoji of a cinema into text which is part of the expanded sequence in field 310. In this way the sequence expander may be used to translate emoji or pictograms into text. This is especially useful for end users with autism or dyslexia who find it easier to input pictograms and emoji rather than text. The sequence expander may also be used to translate from text into emoji or pictograms.

In the example of FIGS. 2 and 3 the virtual keyboard 200 may be a virtual keyboard with word correction and/or word completion functionality. In this case, as the user enters data into the indicator field 210 candidate items are computed and presented to the user for input to the indicator field 210. This is not illustrated in FIGS. 2 and 3 for the sake of clarity, although FIG. 1 does show three candidate items "home", "back", "there" presented as part of the virtual keyboard. Well known word correction and/or word completion technology is used where this facility is part of the embodiments.

Figure 4:
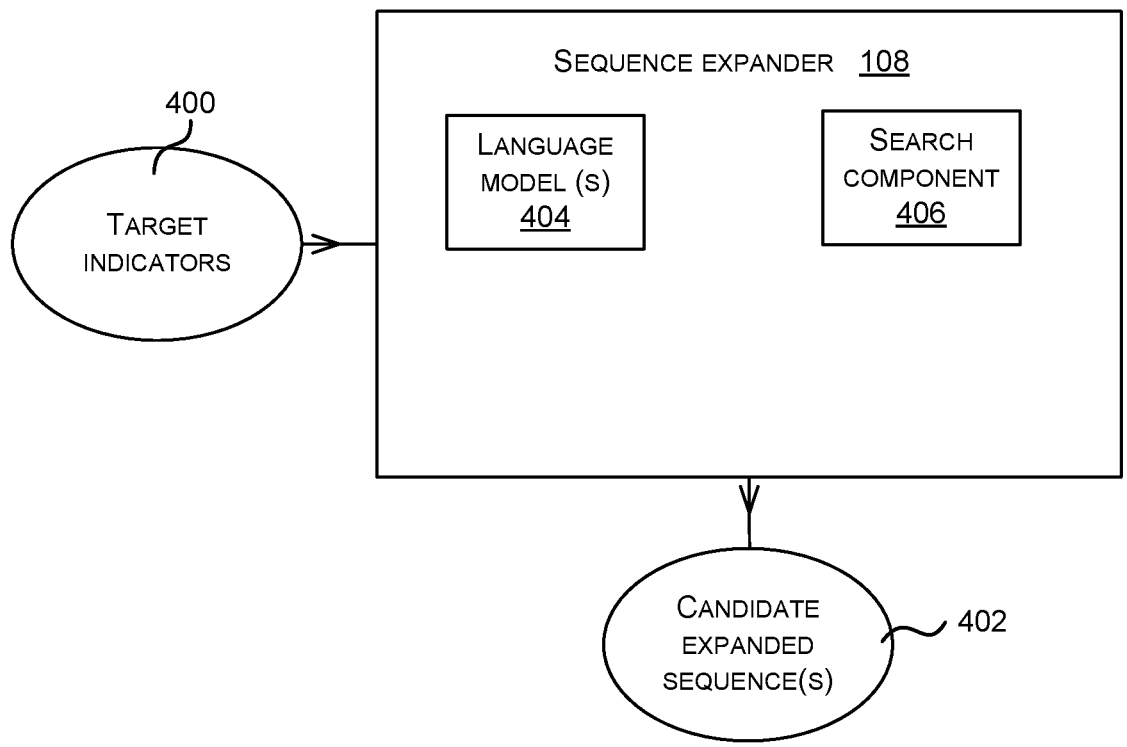
FIG. 4 is a schematic diagram of a sequence expander such as that of FIG. 1.

FIG. 4 shows a sequence expander 108 such as that of FIG. 1. The sequence expander is computer implemented using one or more of software, hardware, firmware and comprises at least one language model 404 and a search component 406. The sequence expander 108 receives as input one or more target indicators 400 and computes at least one candidate expanded sequence of indicators 402 as output. The sequence expander may be configured to generate an expanded sequence of indicators which respects all or part of the order of the target indicators, or may be configured to generate an expanded sequence of indicators which consume the target indicators in any order. The language model 404 is a conditional language model. A conditional language model is one which computes predictions of language items such as words, morphemes, characters or other language items, in dependence on previous language items such as the target indicators in the examples described herein. In some cases the conditional language model comprises a sequence to sequence model; however, a bag of words model may also be used where the order of the target indicators is ignored.

In examples described herein the conditional language model is implemented using neural network technology as described in detail with reference to FIG. 6 later in this document. However, it is not essential to use neural network technology to form the conditional language model as a bag of words model or N-gram model or associative memory may be used The language model is able to generate words, emoji, pictograms or other data items. The search component 406 executes a search algorithm to search data items generated by the language model in order to find the candidate expanded sequence(s) of indicators. The search algorithm comprises a beam search which is a heuristic search as now described with reference to FIG. 5. A beam search operates to search a graph of nodes by selecting a sub-set of nodes from the graph and assessing those nodes according to some assessment metric. The search proceeds in the graph along the paths of the assessed nodes which give the best assessment outcome such as the highest likelihood or probability. By limiting the number of nodes which are assessed at each assessment step the beam search is able to explore the graph in a practical manner even for huge graphs with many thousands of nodes. However, the solution found is not guaranteed to be an optimal solution since many of the nodes of the graph are not considered.

Figure 5:
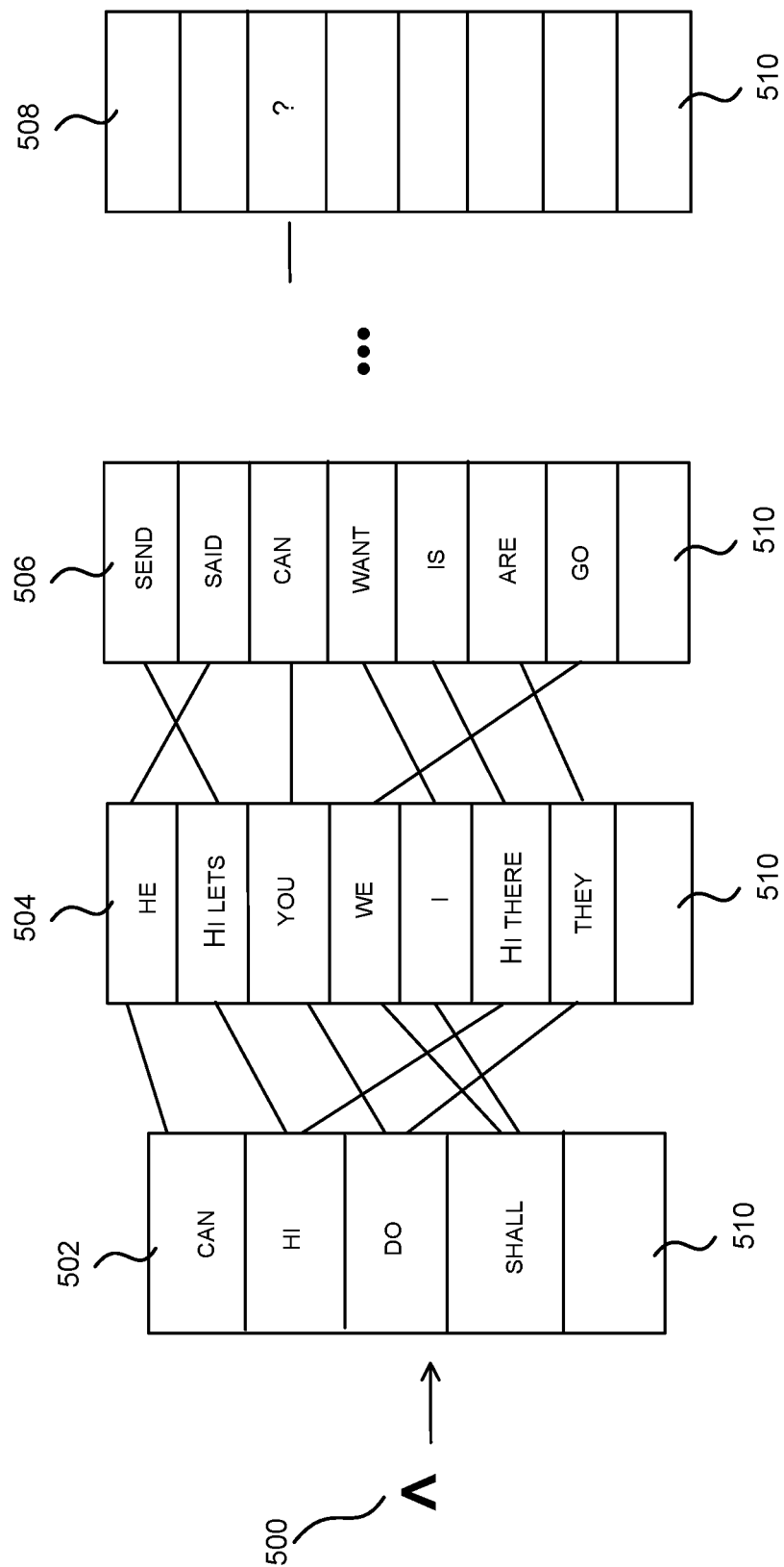
FIG. 5 is a schematic diagram of a beam search used by the search component of FIG. 4.

FIG. 5 shows a start of sequence indicator 500. This represents a situation where the sequence expander is requested or triggered to generate an expanded sequence of indicators given one or more target indicators. For example, suppose the candidate sequence being generated is "Shall we go to the cinema tonight?" and the target indicators are "Go cinema?". The search algorithm proceeds to assess candidate indicators for a first place in an expanded sequence of indicators which is being generated. There exists a very large number of words, pictograms and emoji which could be the first place indicator. Rather than assessing all of these possibilities, the search algorithm uses a beam search where a fixed number of candidates are assessed. In the example of FIG. 5 the beam has a size of four for the first place indicator. Column 502 shows four candidate indicators which in this case are words. The candidate indicators are generated by the language model 404 given the target indicators. One or more of the candidates are emoji or pictograms in some cases. Each of the candidates for the first place indicator is assessed according to an assessment metric. For example, the language model 404 computes a score or probability value associated with each candidate indicator. Candidate indicators are repeatedly generated by the language model 404 and the ones with good scores are retained as indicated in column 502 whilst ones with lower scores are discarded.

The search algorithm also uses start of sequence indicators in some cases. A start of sequence indicator marks the beginning of a piece of text such as a sentence or sequence of pictograms or emoji. The search algorithm is able to identify when a start of sequence indicator occurs and to limit the search to candidate indicators which frequently occur near a start of sequence indicator.

In order to compute candidate indicators for a second place of the expanded sequence the language model is used. The language model takes as input the target indicators and the first candidate from column 502. As a result the candidate indicator "he" is computed and stored in column 504 which stores the candidate indicators for the second place of the expanded sequence. The language model takes as input the target indicators and the second candidate from column 502 i.e. "hi". As a result the candidate indicators "lets" and "there" are computed and stored in column 504. The language model takes as input the target indicators and the third candidate from column 502 i.e. "do". As a result the candidate indicators "you" and "we" are computed and stored in column 504. This process continues until a specified number of entries in column 504 are computed. Scores for entries in column 504 are obtained (from the language model) and used to compute a cumulative score (which may be a probability or logarithm of probability). The cumulative score for the entry "He" in column 504 is the score for that word from the language model plus the score for the entry "can" in column 502 since this follows the path of the search which is a path of a candidate sequence being generated. The entries in column 504 are ordered by the cumulative scores so that low ranking entries are omitted.

In a similar manner candidate indicators are computed using the language model and stored in column 506 for the third place of the expanded sequence. The cumulative scores are computed for entries in column 506 and the entries are ordered. The process repeats for more places of the expanded sequence until an end of sequence indicator is reached, such as a question mark, full stop or other end of sequence indicator as illustrated in column 508 of FIG. 5.

It is possible to have two or more candidate sequences that share some of the text items with another sequence. For example, FIG. 5 shows column 504 having an entry "Hi lets" and an entry for "Hi there" which are both present with different scores (probabilities) and are both extended separately for a third entry in column 506.

The beam search process described with reference to FIG. 5 is adapted to apply one or more hard or soft constraints in some examples. A hard constraint is a criterion which must apply whereas a soft constraint is a penalty or score which influences choices made by the search algorithm. A non-exhaustive list of examples of hard constraints which are used by the search component 406 is: the expanded sequence comprises all of the target indicators, the expanded sequence comprises a specified proportion of the target indicators, the expanded sequence comprises the target indicators in the same order as the order of the target indicators, the expanded sequence comprises at least some of the target indicators in the same order as the order of the target indicators, the expanded sequence has gaps of a maximum of n indicators between target indicators. In order to implement one or more of the hard constraints the search component may discard candidates from the columns 502, 504, 506, 508 which do not meet the constraint and replace those by other candidates computed by the language model 404. However, other ways of implementing hard constraints are also possible. For example, the search component may add target indicators to the columns 502, 504, 506, 508 without these having been generated by the language model 404.

Any one or more of the hard constraints mentioned above may be implemented as a soft constraint by the search component 406. This is done using numerical penalties which are combined with scores of the candidates in columns 502, 504, 506, 508. As mentioned above, each candidate in a column has an associated score computed from an assessment metric, such as by the language model 404. In order to implement a soft constraint, a penalty is applied to one or more of the scores by aggregating the penalty and the score. The aggregation is a multiplication, addition, average, or other aggregation. In order to select which scores to apply the penalty to, and what degree of penalty to apply, the particular constraint being implemented is used. For example, if the soft constraint is that all the target indicators should be in the expanded sequence in the same order as in the target indicators input by the user, then the penalty may be a constant factor applied to all candidates which do not contain the target indicators in the order specified by the user The type and nature of the language model 404 has a significant impact on the ability of the sequence expander 108 to generate relevant expanded sequences in practical time scales using conventional hardware such as in smart phones and other electronic devices. This is because the language model 404 generates the candidates which are searched by the beam search process. By using a language model 404 comprising a neural network that has been trained using pairs, each individual pair comprising a sequence of indicators and a corresponding expanded sequence of indicators, good quality sequence expansion is obtained in practical time scales using conventional electronic devices such as smart phones.

Figure 6:
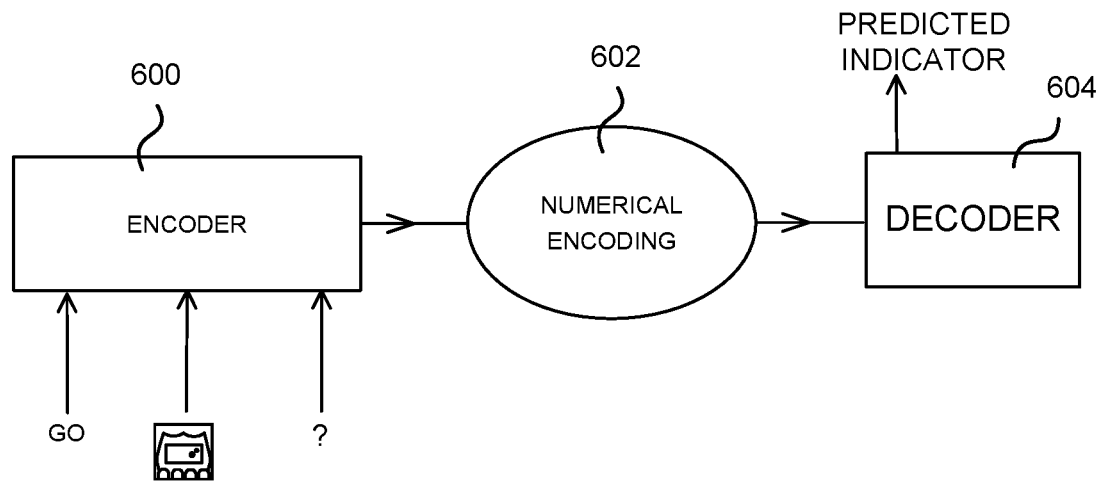
FIG. 6 is a schematic diagram of a neural network architecture comprising an encoder and a decoder.

FIG. 6 shows a language model 404 comprising a neural network architecture with an encoder 600 and a decoder 604. The neural network architecture may comprise a sequence-to-sequence model which is a neural network which receives as input a sequence of items and computes as output a sequence of items.

In the example of FIG. 6 the encoder 600 is a neural network such as a recurrent neural network and the decoder 604 is also a neural network.

A neural network is a collection of nodes (also referred to as units) interconnected by edges and where there are weights associated with the nodes and/or edges. A non-linear function is commonly applied in each node to produce its activation and a non-exhaustive list of non-linear functions which may be used is: sigmoid, tan h, rectifier. During a training phase the weights are updated according to update rules in the light of training examples. The units comprise input units, hidden units and output units. Input units are units at which input is made to the neural network, hidden units are connected between input units and output units (or other hidden units in the case of deep networks), and output units are units at which output from the neural network is observed. A neural network may have a layered construction with a layer of input nodes, one or more layers of hidden units and at least one output layer. During use of the neural network at test time (i.e. after training) as a signal passes through a layer it produces an output via the activations which becomes the input to the next layer of the neural network and so on, until the signal reaches the output layer and the output units are activated. The pattern of activations at the output layer gives the prediction of the neural network. The pattern of activations has been influenced by the weights learnt during the training phase.

In the example of FIG. 6 the encoder is a neural network with a recurrent structure where connections between units form a directed cycle. Both encoder and decoder are constructed using a neural network that maps an input and a hidden state to a new hidden state, and optionally a separate output. This neural network can be a simple neural layer, or one of the many forms known in the art (e.g. the Gated Recurrent Unit, or Long Short Term Memory). This structure is then "unrolled" over time, given each input in sequence to produce a sequence of hidden states. In the case of the encoder, some combination of the hidden states (e.g. the final hidden state) is the output of the encoder network. For the decoder, the inputs are the output sequence so far, and the hidden state at each timestep is used to predict the next element from the output sequence. The encoder can be connected to the decoder in a variety of ways, for example to define the initial hidden state, or as an additional input at each timestep, or in a more advanced data-dependent manner. One more advanced technique would be to feed as input into the decoder the encoding of the next indicator expected to arrive, given the text generated so far. Both the encoder & decoder may be run in a forwards and reverse scan through the text. For example, the encoder output could be generated by concatenating the output of a forward sequence encoder and a reverse sequence encoder RNN. In the case of the decoder, separate decoders could be trained in the forwards and reverse directions to generate the sequence from the encoder output.

In some examples the language model 404 is implemented using an associative memory. In this case candidate generation is an associative memory retrieval problem, with interpolation used between memory fragments for longer reconstructions. A sublist of the target indicators maps to some output indicators using an associative memory. When a neural architecture (autoassociative memory) is used as the associated memory then the potential for fuzziness and abstraction may be improved over other types of associative memory. Context could be incorporated and longer lists of target indicators may be processed by interpolating between results using a separate model.

The encoder 600 and decoder 604 (or the associative memory) are trained using pairs, each individual pair comprising a sequence of indicators and a corresponding expanded sequence of indicators. The training process is explained in more detail with reference to FIG. 8. The encoder 600 is configured to receive one or more indicators, such as the target indicators, in numerical form. Thus FIG. 6 shows the encoder 600 receiving the target indicators "go" "an emoji depicting a cinema" and "?". These indicators are converted into a numerical form before being input to the encoder 600. The numerical form is referred to as an embedding. The embeddings are pre-computed or learnt during training of the language model so that the embeddings are suited to the task and data being used. The embeddings may be stored in a table which is used to look up embeddings for particular indicators.

In some examples the encoder receives additional evidence as well as the indicators. The additional evidence comprises one or more of: encoded representations of previous sentences in a conversation context, encoded representations of recent text entered by the user, either through the sequence expansion system and in any other way, other context such as time-of-day/month/year, location, information from device sensors on a mobile device. Using additional evidence in this manner improves the accuracy and/or relevance of the numerical encoding 602 computed by the encoder and hence improves the accuracy and/or relevance of predictions computed by the decoder. Where additional evidence is used, the training of the encoder and decoder comprises using training data that comprises the type of additional evidence to be used. However, it is not essential to use additional evidence.

The encoder computes a numerical encoding 602 of the indicators it received. The numerical encoding is a final hidden state of the neural network and has a fixed size. The final hidden state is the value computed at each of the nodes in the final hidden layer of the neural network. These values are stored in a vector of fixed length or other format. The vector is passed to the decoder 604 as input. The vector can be referred to as a thought vector which represents the meaning of a sentence or piece of text, given some but not all constituent parts of the sentence or piece of text.

The decoder 604 receives the numerical encoding 602 and computes, in conjuction with the search algorithm, a predicted sequence of indicators such as a sequence of predicted words or emoji or pictograms. The predicted indicators from the decoder 604 are used to populate the columns of the beam search as described above with reference to FIG. 5.

Figure 7:
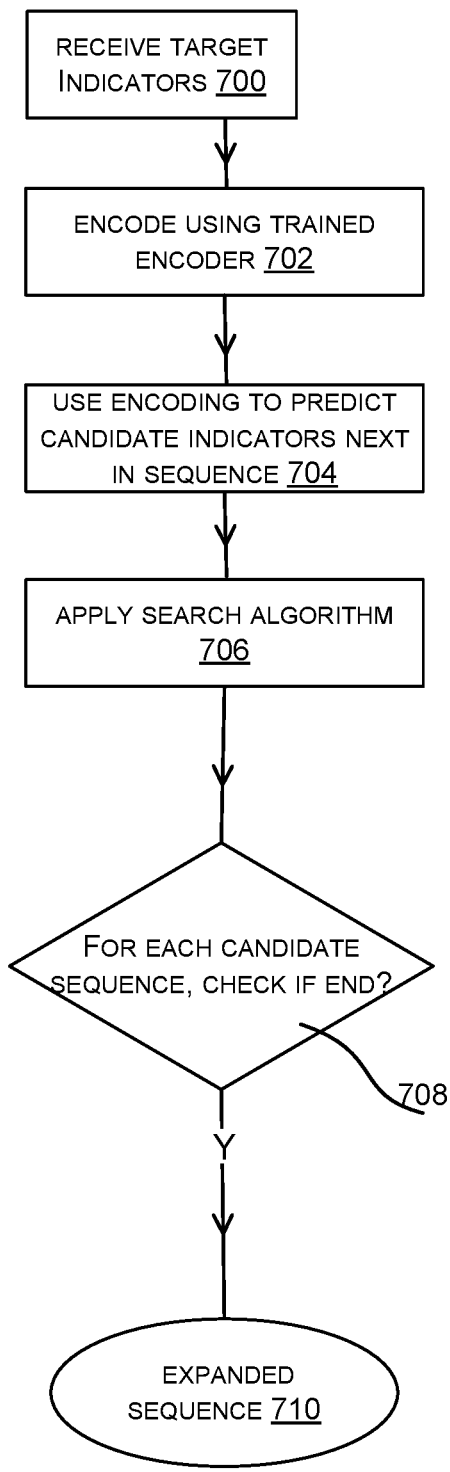
FIG. 7 is a flow diagram of a method of operation at a sequence expander such as that of FIG. 4.

A method of operation at a sequence expander 108 is now described with reference to FIG. 7. The sequence expander 108 receives one or more target indicators 700. For example, these are received from a user interface such as a virtual keyboard, microphone and speech to text conversion process, gesture detector, or other user interface technology. In some cases the sequence expander 108 receives the target indicators in a message from an electronic device sent over a communications network 100. In some cases the sequence expander 108 translates the target indicators it receives. For example, it translates emoji into words or pictograms into words. In this way, a user is able to enter pictograms and receive an expanded sequence comprising words.

The sequence expander 108 encodes 702 the target indicators using a trained encoder such as the encoder 600 of FIG. 6. This produces a numerical encoding 602. The numerical encoding is used 704 to predict a plurality of candidate indicators. Suppose the target indicators are "go" "an emoji depicting a cinema" and "?". The encoder 600 produces a numerical encoding in response to "go" "an emoji depicting a cinema" and "?". This numerical encoding is used by the decoder to generate candidate indicators. For example, in the case of FIG. 5 many candidate indicators are generated by the decoder to go into column 502 and the search algorithm is applied 706 to those as explained with reference to FIG. 5. For example, by applying one or more soft or hard constraints to compute the scores. Suppose that as a result the candidates "can", "hi", "do" and "shall" result in column 502. To advance the search by a single step (from column 502 to 504 or from 504 to 506), the decoder is queried for each candidate indicator sequence in the source column (502), with the numerical encoding from the encoder and generates a set of candidates to populate the destination column (504). This large joint set of candidates for the destination column are filtered using the soft and hard constraints to select which ones. The links between the items in the columns of FIG. 5 indicate candidate sequences that the search algorithm is investigating. For each candidate sequence a check 708 is made to see if the process should end or not for that individual sequence. If an end of sequence indicator has been found then the process ends for that individual candidate sequence so that different candidate sequences may have difference lengths. If the number of indicators in a candidate sequence being investigated by the search has reached a maximum then the process ends for that individual candidate sequence. In some examples, the final output of the process is a single expanded sequence 710 where only one sequence is found which meets the soft and/or hard constraints being used (such as having all the target indicators in the order specified by the user). In the example discussed above where the target indicators are "go" "an emoji depicting a cinema" and "?" the expanded sequence 710 may be "shall we go to the cinema tonight?". As indicated in FIG. 5 "shall", "we" and "go" form the initial part of a candidate sequence. Because this candidate sequence comprises one of the target indicators i.e. "go" it is pursued by the search algorithm which eventually finds "shall we go to the cinema tonight?". Note that the words "to", "the", "cinema", "tonight" are not shown in FIG. 5 for clarity.

The neural network architecture of FIG. 6 (or the associated memory) is trained using pairs, each individual pair comprising a sequence of indicators and a corresponding expanded sequence of indicators. In some examples paired training data is computed by taking full sentences and removing one or more words from the sentences. In some examples this is done by dropping words with some probability based on criteria such as frequency of the words in a corpus of documents. Higher frequency words are more likely to be dropped. Other criteria that may be used include how often the word appears in the training data, referred to as term-frequency inverse document frequency, which has a greater value for rare words. In some examples words are dropped if they occur in a fixed symbol table such as a table of stop words or function words. In another example, a word may be dropped according to the prediction uncertainty of that word given all the surrounding words (e.g. using a bidirectional recurrent neural network (RNN) to predict a word given the words preceding and succeeding that word). By generating synthetic training data it is possible to obtain large amounts of training data and this facilitates training of the neural network.

Training pairs are generated using a trained classifier in some examples. A few pairs of manually generated sentences and their counterparts with some missing words are obtained and used to train a classifier so that it classifies words as being words to retain or words to drop from a sentence. The trained classifier is then used to generate training pairs. By using a trained classifier in this way it is possible to obtain synthetic training data of high quality so that the performance of the resulting trained neural network is enhanced.

In some examples training pairs are obtained from empirically observed data. For example, logs of queries submitted to an information retrieval system are used to obtain queries and corresponding expanded queries selected by a user. By using empirically observed data it is possible to obtain high quality training data so that the neural network architecture can be trained well.

Figure 8:
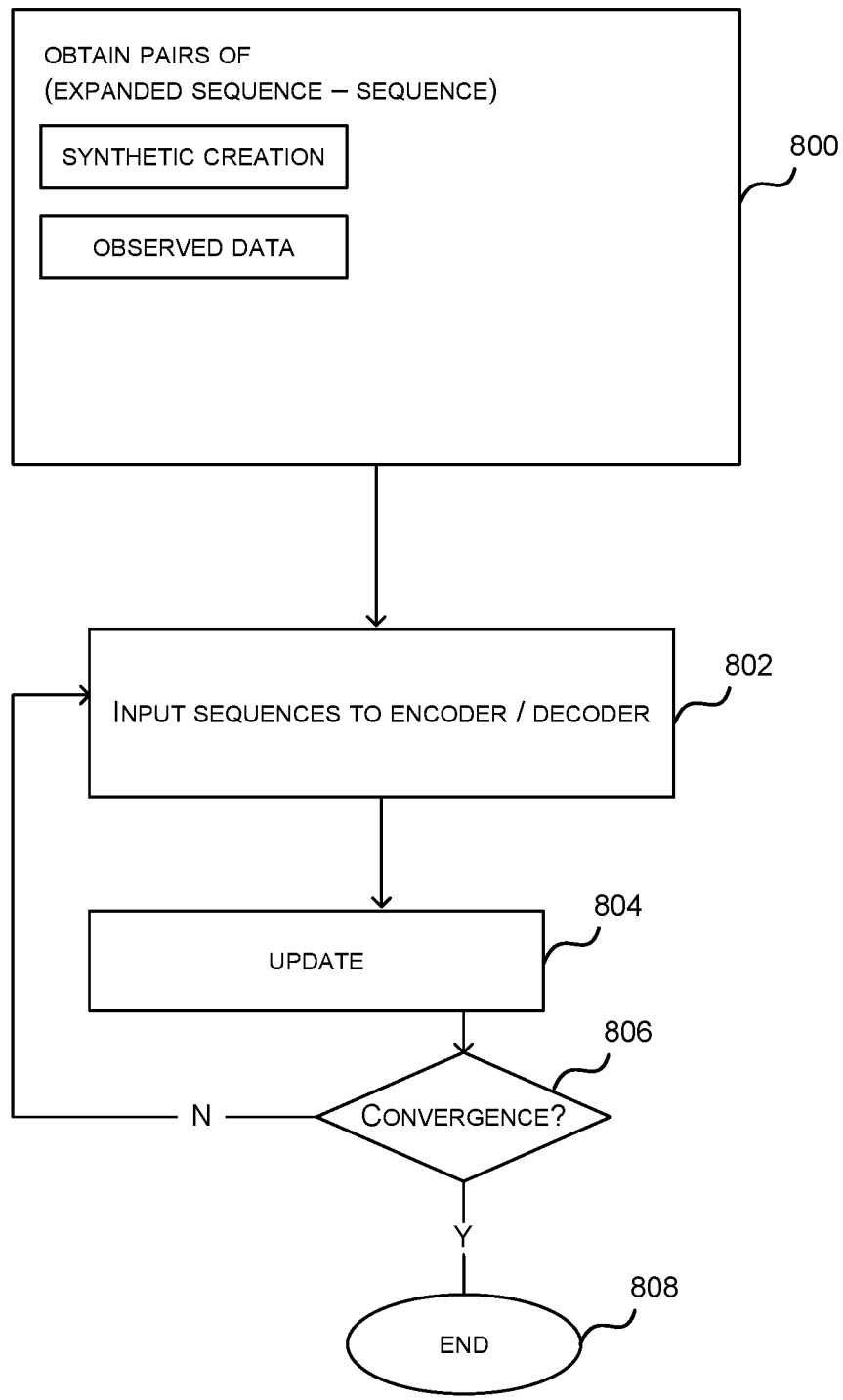
FIG. 8 is a flow diagram of a method of training a neural network architecture such as that of FIG. 6.

As indicated in FIG. 8 training data pairs are obtained 800 using synthetic creation and/or observed data. A reduced form sequence of a pairs is input to the encoder to generate a numerical encoding and the numerical encoding is input to the decoder. Backpropagation or any other update process 804 is used to update weights at the nodes of the neural network encoder and decoder in the light of the full form sequence of the pair which is known from the training data. A check 806 is made to see if the training process should end. For example, training may end when the updates to the weights have reached convergence or when a fixed number of updates have been made. If training is to continue the process repeats from operation 802. If training is to end the process ends at operation 808 and the trained neural network is stored.

The neural network is trained using back propagation or any other neural network training algorithm. A back propagation algorithm comprises inputting a labeled training data instance to the neural network, propagating the training instance through the neural network (referred to as forward propagation) and observing the output. The training data instance is labeled and so the ground truth output of the neural network is known and the difference or error between the observed output and the ground truth output is found and provides information about a loss function. A search is made to try find a minimum of the loss function which is a set of weights of the neural network that enable the output of the neural network to match the ground truth data. Searching the loss function is achieved using gradient descent or stochastic gradient descent or in other ways. For example the loss function is the cross entropy of the true sequence with the neural sequence expander in some cases.

Figure 9:
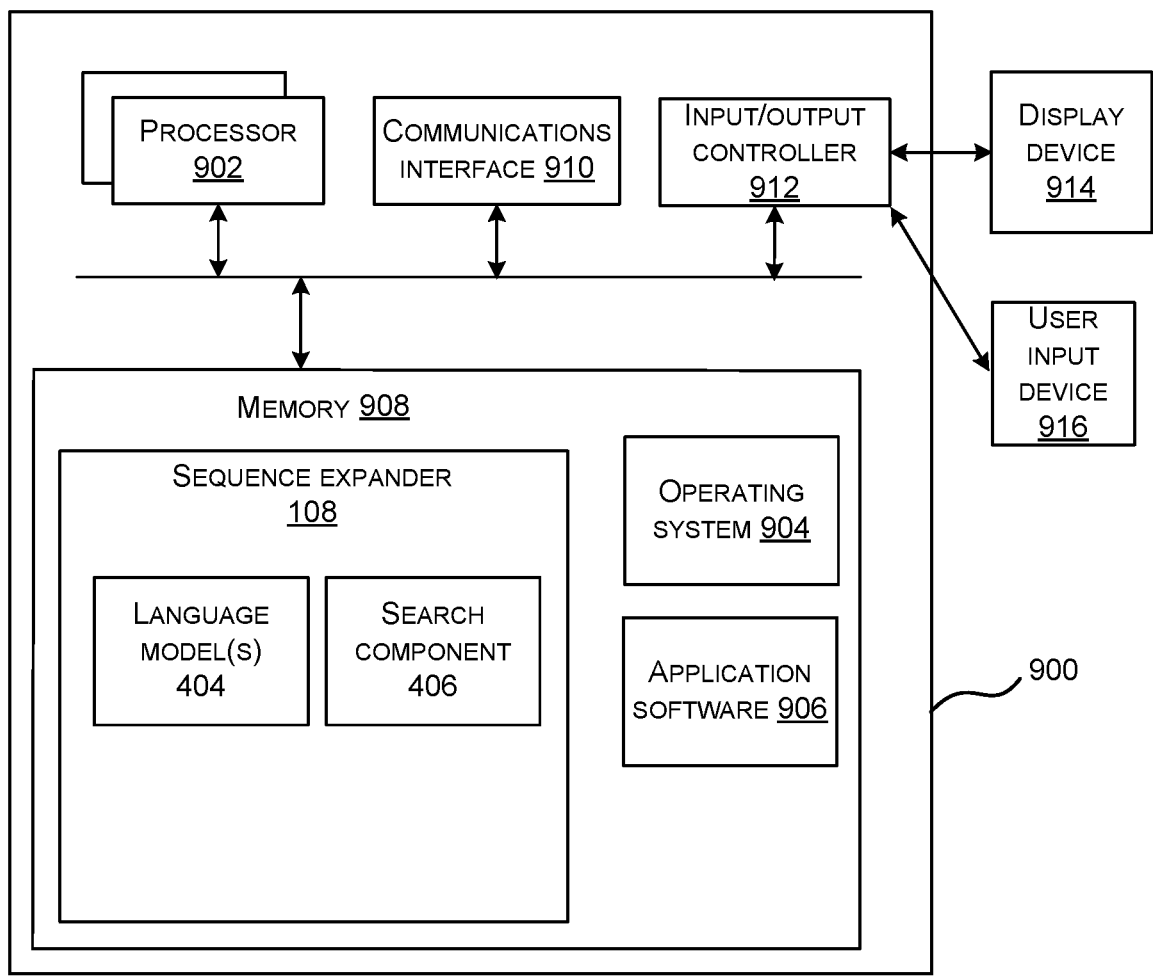
FIG. 9 illustrates an exemplary computing-based device in which embodiments of a sequence expander are implemented.

FIG. 9 illustrates various components of an exemplary computing-based device 900 which are implemented as any form of a computing and/or electronic device including but not limited to a smart watch, a wearable computer, a smart phone, an augmented reality head set, a tablet computer, a desktop personal computer, and in which embodiments of a data entry system or information retrieval system are implemented in some examples.

Computing-based device 900 comprises one or more processors 902 which are microprocessors, controllers or any other suitable type of processors for processing computer executable instructions to control the operation of the device in order to expand a sequence of indicators such as a sentence, a piece of text, a sequence of emoji, a sequence of pictograms. In some examples, for example where a system on a chip architecture is used, the processors 902 include one or more fixed function blocks (also referred to as accelerators) which implement a part of the method of FIG. 9 in hardware (rather than software or firmware). Platform software comprising an operating system 904 or any other suitable platform software is provided at the computing-based device to enable application software 906 to be executed on the device. For example, the application software comprises a messaging application, an information retrieval application, a predictive keyboard, or other application. A sequence expander 108 at the computing-based device comprises a language model 404 and a search component 406 as described above with reference to FIG. 4.

The computer executable instructions are provided using any computer-readable media that is accessible by computing based device 900. Computer-readable media includes, for example, computer storage media such as memory 908 and communications media. Computer storage media, such as memory 908, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 908) is shown within the computing-based device 900 it will be appreciated that the storage is, in some examples, distributed or located remotely and accessed via a network or other communication link (e.g. using communication interface 910 which is a network card, a transceiver, or other communication interface).

The computing-based device 900 also comprises an input/output controller 912 arranged to output display information to a display device 914 which may be separate from or integral to the computing-based device 900. The display information may provide a graphical user interface. The input/output controller 912 is also arranged to receive and process input from one or more devices, such as a user input device 916 (e.g. a mouse, keyboard, camera, microphone or other sensor). In some examples the user input device 916 detects voice input, user gestures or other user actions and provides a natural user interface (NUI). This user input may be used to input target indicators, edit expanded sequences of indicators, view search results, create training data. In an embodiment the display device 914 also acts as the user input device 916 if it is a touch sensitive display device. The input/output controller 912 outputs data to devices other than the display device in some examples, e.g. a locally connected printing device.

Any of the input/output controller 912, display device 914 and the user input device 916 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A data entry system comprising:

a user interface which receives an input comprising a sequence of target indicators of data items; and a search component which searches for candidate expanded sequences of indicators comprising the target indicators or translations of the target indicators;

wherein the search component searches amongst indicators generated by a trained conditional language model, the conditional language model having been trained using pairs, each individual pair comprising a sequence of indicators and a corresponding expanded sequence of indicators.

The data entry system described above wherein the conditional language model is formed using a neural network.

The data entry system described above wherein the search algorithm comprises a beam search which searches, at each place in the candidate expanded sequence of indicators, a set of indicators, the sets of indicators being found using the conditional language model.

The data entry system described above wherein the sets of indicators are found from the conditional language model which is a neural network, where the neural network is a sequence-to-sequence model, by inputting the target indicators to an encoder of the neural network and predicting indicators using a decoder of the neural network.

The data entry system described above wherein the data items comprise one or more of: a word, an emoji, a pictogram, an emoticon.

The data entry system described above wherein the user interface comprises a predictive keyboard and wherein at least one of the target indicators of data items is a word which has been corrected or completed by the predictive keyboard.

The data entry system described above wherein the search component comprises at least one search algorithm for searching for candidate expanded sequences of indicators comprising the target indicators the search algorithm applying a penalty based on the presence or absence of the target indicators in the candidate expanded sequences.

The data entry system described above wherein the search component comprises at least one search algorithm to search for candidate expanded sequences of indicators comprising the target indicators the search algorithm applying at least one constraint selected from: a number of the target indicators, a sequence of the target indicators, a sequence of a subset of the target indicators, a maximum number of indicators between target indicators.

The data entry system described above wherein the trained conditional language model comprises an encoder and a decoder, the encoder having been trained to generate a vector of numerical values which represent a meaning of a sequence of target indicators input to the encoder.

The data entry system described above wherein the encoder is a recurrent neural network and the vector of numerical values is a hidden state of the recurrent neural network.

The data entry system described above wherein the decoder comprises a neural network trained to receive the vector of numerical values from the encoder and to predict at least one data item.

The data entry system described above wherein the decoder has been trained using the pairs, each individual pair comprising a sequence of indicators and a corresponding expanded sequence of indicators.

The data entry system described above wherein the decoder has been trained using pairs obtained from empirically observed search query expansion data.

The data entry system described above wherein the decoder has been trained using pairs obtained from synthetic data computed by deleting words from sentences by detecting detecting any one or more of: high frequency words, words in a list of known stop-words, words found to have high likelihood given a context of the words.

The data entry system described above wherein the user interface comprises a target indicator input field and a candidate expanded sequence of indicators field, and wherein the user interface comprises a toggle facility to enable a user to toggle between the target indicator input field and the candidate expanded sequence of indicators field.

A computer-implemented method comprising:
receiving an input comprising a sequence of target indicators of data items;
using the target indicators to generate indicators using a trained conditional language model, the conditional language model having been trained using pairs, each individual pair comprising a sequence of indicators and a corresponding expanded sequence of indicators; and
searching for candidate expanded sequences of indicators comprising the target indicators or translations of the target indicators by searching amongst the indicators generated by the trained neural network.

The method described above comprising using the candidate expanded sequences of indicators to facilitate data entry or information retrieval.

The method described above wherein the target indicators comprise emoji or pictograms and wherein the candidate expanded sequences of indicators comprise words such that the method facilitates generation of text by autistic or dyslexic people.

The method described above comprising training the conditional language model using the pairs.

One or more tangible device-readable media with device-executable instructions that, when executed by a computing system, direct the computing system to perform operations comprising:
receiving an input comprising a sequence of target indicators of data items;
using the target indicators to generate indicators using a trained conditional language model, the conditional language model having been trained using pairs, each individual pair comprising a sequence of indicators and a corresponding expanded sequence of indicators; and
searching for candidate expanded sequences of indicators comprising the target indicators or translations of the target indicators by searching amongst the indicators generated by the trained conditional language model.

The examples illustrated and described herein as well as examples not specifically described herein but within the scope of aspects of the disclosure constitute exemplary means for computing an expanded sequence of indicators given a plurality of target indicators. For example, the elements illustrated in FIG. 9, such as when encoded to perform the operations illustrated in FIGS. 5 and 7, constitute exemplary means for computing an expanded sequence of indicators. In an example, means for receiving an input comprising a sequence of target indicators of data items comprises input/output controller 912 in conjunction with user input device 916. In an example, means for using the target indicators to generate indicators comprises a trained neural network such as that of FIG. 6, the neural network having been trained using pairs, each individual pair comprising a sequence of indicators and a corresponding expanded sequence of indicators. In an example, means for searching for candidate expanded sequences of indicators comprises a search component such as that of FIG. 4

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A data entry system comprising a processor and memory, the memory storing thereon computer-readable instructions that, when executed by the processor, cause the data entry system to perform operations comprising:
   instantiating a user interface;
   receiving an input via the user interface;
   identifying one or more target indicators of data items from the input;
   inputting the target indicators to an encoder of a trained conditional language model, the encoder implemented using a neural network;
   generating a plurality of searchable indicators, based on the target indicators input to the encoder, by a decoder of the trained conditional language model using output from the encoder, wherein the decoder is implemented using a neural network, and wherein the trained conditional language model is trained using one or more pairs that each comprise one or more indicators and a corresponding expanded sequence of indicators, each of the one or more pairs comprising empirically observed search query expansion data, synthetic data computed from deleting words from sentences, data produced from detecting high frequency words, words in a list of known stop-words, or words found to have high likelihood given a context of the words, or combinations thereof, and wherein the plurality of searchable indicators are each mapped to the one or more target indicators or translations of the one or more target indicators, the one or more target indicators and the plurality of searchable indicators each including text or an image;
   searching text items, using the plurality of searchable indicators as search terms, to generate, from the text items, candidate expanded sequences corresponding to the plurality of searchable indicators, each of the candidate expanded sequences comprising a subset of the plurality of searchable indicators wherein searching comprises a beam search;
   using the candidate expanded sequences of indicators to facilitate data entry or information retrieval; and
   rendering the candidate expanded sequences to replace the one or more target indicators.

2. The data entry system of claim 1, wherein the conditional language model is formed using a neural network.

3. The data entry system of claim 1, wherein the searching is performed using a beam search which searches, at each place in the candidate expanded sequence of indicators, a set of indicators, the sets of indicators being subsets of the plurality of searchable indicators formed using the conditional language model.

4. The data entry system of claim 3, wherein:
the sets of indicators are found from the conditional language model;
the conditional language model comprises a neural network which comprises a sequence-to-sequence model;
the operations further comprising inputting the one or more target indicators to an encoder of the neural network and predicting indicators using a decoder of the neural network.

5. The data entry system of claim 1, wherein the data items comprise one or more of: a word, an emoji, a pictogram, and an emoticon.

6. The data entry system of claim 1, wherein the user interface comprises a predictive keyboard and wherein at least one of the one or more target indicators of data items is a word which has been corrected or completed by the predictive keyboard.

7. The data entry system of claim 1, wherein the searching is performed using a search algorithm for searching for candidate expanded sequences of indicators comprising the one or more target indicators, the search algorithm applying a penalty based on the presence or absence of the one or more target indicators in the candidate expanded sequences.

8. The data entry system of claim 1, wherein the searching is performed using at least one search algorithm to search for candidate expanded sequences of indicators comprising the one or more target indicators, the search algorithm applying at least one constraint selected from:
a number of the one or more target indicators, a sequence of the one or more target indicators, a sequence of a subset of the one or more target indicators, and a maximum number of indicators between the one or more target indicators.

9. The data entry system of claim 1, wherein the trained conditional language model comprises an encoder and a decoder, the encoder having been trained to generate a vector of numerical values which represent a meaning of a sequence of the one or more target indicators input to the encoder.

10. The data entry system of claim 9, wherein the encoder is a recurrent neural network and the vector of numerical values is a hidden state of the recurrent neural network.

11. The data entry system of claim 9, wherein the decoder comprises a neural network trained to receive the vector of numerical values from the encoder and to predict at least one data item.

12. The data entry system of claim 9, wherein the decoder has been trained using the pairs, each individual pair comprising a sequence of indicators and a corresponding expanded sequence of indicators.

13. The data entry system of claim 12, wherein the decoder has been trained using pairs obtained from empirically observed search query expansion data.

14. The data entry system of claim 12, wherein the decoder has been trained using pairs obtained from synthetic data computed by deleting words from sentences by detecting any one or more of: high frequency words, words in a list of known stop-words, and words found to have high likelihood given a context of the words.

15. The data entry system of claim 1, wherein the user interface comprises a target indicator input field and a candidate expanded sequence of indicators field, and wherein the user interface comprises a toggle facility to enable a user to toggle between the target indicator input field and the candidate expanded sequence of indicators field.

16. A computer-implemented method comprising:
receiving, by a computing device, an input via a user interface;
identifying one or more target indicators of data items from the input;
inputting the target indicators to an encoder of a trained conditional language model, the encoder implemented using a neural network;
generating, by the computing device, a plurality of searchable indicators, based on the target indicators input to the encoder, using a decoder of the trained conditional language model using output from the encoder, wherein the decoder is implemented using a neural network, and wherein the trained conditional language model is trained using pairs, the pairs comprising an indicator or a sequence of indicators and a corresponding expanded sequence of indicators, each of the pairs comprising empirically observed search query expansion data, synthetic data computed from deleting words from sentences, data produced from detecting high frequency words, words in a list of known stop-words, or words found to have high likelihood given a context of the words, or combinations thereof, the one or more target indicators and the plurality of searchable indicators each including text or an image;
searching text items, using the plurality of searchable indicators as search terms, to by the computing device from the text items, candidate expanded sequences corresponding to the plurality of searchable indicators, the plurality of searchable indicators each mapped to the one or more target indicators or translations of the one or more target indicators, wherein the candidate expanded sequences each comprise a subset of the plurality of searchable indicators wherein searching comprises a beam search;
using the candidate expanded sequences to facilitate data entry or information retrieval; and
rendering, by the computing device, one or more of the candidate expanded sequences on a user interface communicatively coupled to the computing device, the one or more candidate expanded sequences replacing the one or more target indicators.

17. The method of claim 16, further comprising using the candidate expanded sequences of indicators to facilitate data entry or information retrieval.

18. The method of claim 16, wherein the data items comprise emoji or pictograms and wherein the candidate expanded sequences of indicators comprise words such that the method facilitates generation of text by autistic or dyslexic users.

19. The method of claim 16, further comprising training the conditional language model using the pairs.

20. One or more computer storage media storing thereon computer-executable instructions that, when executed by a computing system, cause the computing system to perform operations comprising:
receiving an input via a user interface;
identifying one or more target indicators of data items from the input;
inputting the target indicators to an encoder of a trained conditional language model, the encoder implemented using a neural network;
generating a plurality of searchable indicators, based on the target indicators input to the encoder, using a decoder of the trained conditional language model using output from the encoder, wherein the trained conditional language model is trained using pairs, each of the pairs comprising an indicator or a sequence of indicators and a corresponding expanded sequence of indicators, each of the pairs comprising empirically observed search query expansion data, synthetic data computed from deleting words from sentences, data produced from detecting high frequency words, words in a list of known stop-words, or words found to have high likelihood given a context of the words, or combinations thereof, the one or more target indicators and the plurality of searchable indicators each including text or an image; and searching text items, using the plurality of searchable indicators as search terms, to generate, from the text items, candidate expanded sequences corresponding to the plurality of searchable indicators, each of the plurality of searchable indicators mapped to the one or more target indicators or translations of the one or more target indicators, wherein the candidate expanded sequences each comprise a subset of the plurality of searchable indicators wherein searching comprises a beam search;

using the candidate expanded sequences to facilitate data entry or information retrieval; and rendering the candidate expanded sequences of indicators replacing the one or more target indicators.

* * * * *